United States Patent
Masuko (10) Patent No.: US 9,646,576 B2
(45) Date of Patent: May 9, 2017

(54) TERMINAL DEVICE, CONTROL METHOD FOR TERMINAL DEVICE, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/781,030

(22) PCT Filed: Mar. 29, 2013

(86) PCT No.: PCT/JP2013/059771
§ 371 (c)(1),
(2) Date: Jan. 15, 2016

(87) PCT Pub. No.: WO2014/155748
PCT Pub. Date: Oct. 2, 2014

(65) Prior Publication Data
US 2016/0163289 A1    Jun. 9, 2016

(51) Int. Cl.
*G09G 5/38* (2006.01)
*G09G 3/20* (2006.01)
(Continued)

(52) U.S. Cl.
CPC ............ *G09G 5/38* (2013.01); *G06F 1/1686* (2013.01); *G06F 1/1694* (2013.01); *G06F 3/005* (2013.01);
(Continued)

(58) Field of Classification Search
CPC ............ H04M 1/0233; H04M 2250/52; G06T 7/0044; H04W 52/0254; G06F 3/012;
(Continued)

(56) References Cited

U.S. PATENT DOCUMENTS

2004/0017930 A1    1/2004  Kim et al.
2012/0057064 A1*   3/2012  Gardiner .............. G06F 1/1626
                                             348/333.12
(Continued)

FOREIGN PATENT DOCUMENTS

JP    H05-068245 A    3/1993
JP    H07-029014 A    1/1995
(Continued)

OTHER PUBLICATIONS

English Translation of International Search Report for PCT/JP2013/059771 dated Jun. 18, 2013.
(Continued)

*Primary Examiner* — Haixa Du
(74) *Attorney, Agent, or Firm* — Hubbs, Enatsky & Inoue PLLC (57) ABSTRACT

An inclination detection unit detects an inclination of the terminal device. A screen image rotation unit rotates a screen image when an inclination state of the terminal device detected by the inclination detection unit becomes a predetermined state. A captured image obtaining unit obtains a captured image of an image capturing unit for capturing an image of a user seeing the screen image. A comparison unit compares a captured image of the image capturing unit before the inclination state of the terminal device becomes the predetermined state with a captured image of the image capturing unit when or after the inclination state of the terminal device becomes the predetermined state. A suppression unit suppresses a rotation of the screen image by the screen image rotation unit, based on a result of comparison by the comparison unit.

7 Claims, 9 Drawing Sheets

(51) Int. Cl.
*G06F 1/16* (2006.01)
*G06F 3/01* (2006.01)
*G06F 3/00* (2006.01)
*G09G 5/00* (2006.01)
*H04N 5/232* (2006.01)
*G06T 7/73* (2017.01)

(52) U.S. Cl.
CPC ............... *G06F 3/012* (2013.01); *G06T 7/74* (2017.01); *G09G 3/20* (2013.01); *G09G 5/006* (2013.01); *H04N 5/23219* (2013.01); *H04N 5/23245* (2013.01); *H04N 5/23293* (2013.01); *G06F 2200/1637* (2013.01); *G06T 2207/10016* (2013.01); *G06T 2207/30201* (2013.01); *G09G 2320/08* (2013.01); *G09G 2340/0464* (2013.01); *G09G 2340/0492* (2013.01); *G09G 2354/00* (2013.01)

(58) Field of Classification Search
CPC ........... G06F 2200/1614; G06F 3/0346; G06F 3/017; G06F 3/013; G09G 2340/0492; H04N 13/0468; H04N 2201/3254; H04N 13/0479
See application file for complete search history.

(56) References Cited

U.S. PATENT DOCUMENTS

| | | | | |
|---|---|---|---|---|
| 2012/0313970 | A1* | 12/2012 | Akiyama | ................. G09G 3/20 345/651 |
| 2013/0069988 | A1* | 3/2013 | Kamei | ................. G06F 1/1637 345/658 |
| 2014/0057675 | A1* | 2/2014 | Meyers | ............. H04M 1/72594 455/556.1 |

FOREIGN PATENT DOCUMENTS

| | | |
|---|---|---|
| JP | H11-161798 A | 6/1999 |
| JP | 2000-137788 A | 5/2000 |
| JP | 2004-054960 A | 2/2004 |
| JP | 2004-070411 A | 3/2004 |
| JP | 2008-131616 A | 6/2008 |
| JP | 2011-138449 A | 7/2011 |
| JP | 2012-070381 A | 4/2012 |
| WO | 2012/120799 A1 | 9/2012 |

OTHER PUBLICATIONS

The partial translation of OA for corresponding Patent Application No. JP2014-555892 dated Jan. 6, 2015 and Apr. 7, 2015.

* cited by examiner

ABCDEFGHIJKLM
NOPQRSTUVWXY
Z0123456789A
BCDEFGHIJKLM
NOPQRSTUVWXY

TERMINAL DEVICE, CONTROL METHOD FOR TERMINAL DEVICE, PROGRAM, AND INFORMATION STORAGE MEDIUM

CROSS REFERENCE TO RELATED APPLICATIONS

This application is a National Stage of International Application No. PCT/JP2013/059771 filed on Mar. 29, 2013. The contents of the above document is incorporated herein by reference in its entirety.

TECHNICAL FIELD

The present invention relates to a terminal device, a control method for a terminal device, a program, and an information storage medium.

BACKGROUND ART

Figure 11:
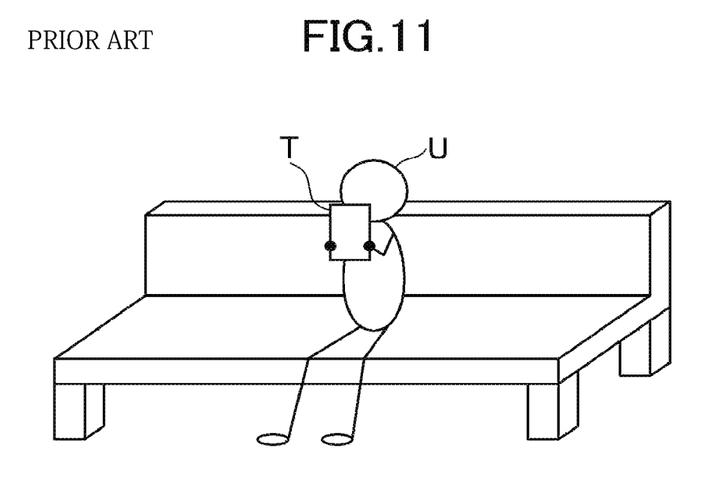
FIG. 11 is a diagram explaining a conventional terminal device.
Figure 12:
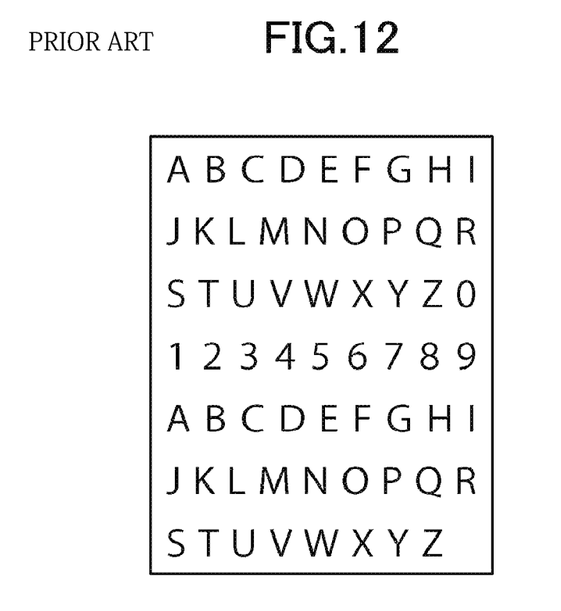
FIG. 12 is a diagram explaining a conventional terminal device.
Figure 13:
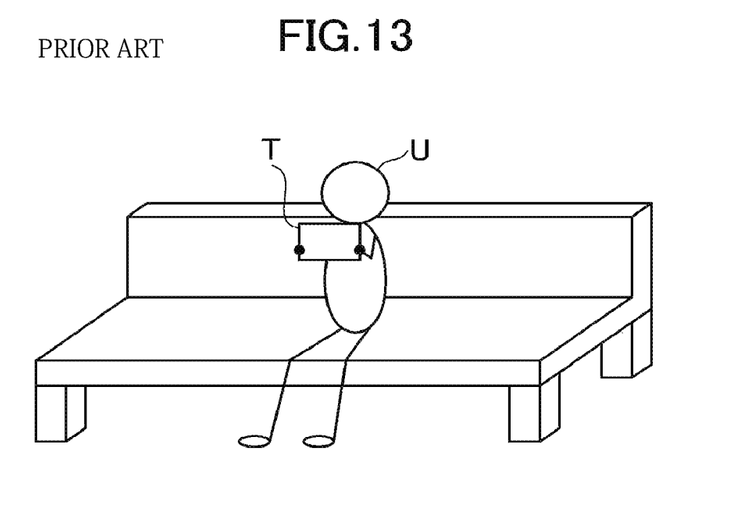
FIG. 13 is a diagram explaining a conventional terminal device.
Figure 14:
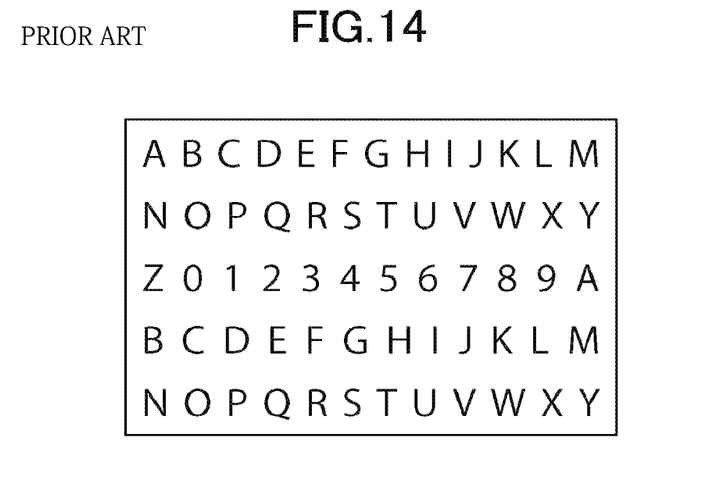
FIG. 14 is a diagram explaining a conventional terminal device.

There has been known a terminal device having a function for automatically rotating a screen image displayed on a display unit in accordance with the posture (inclination) of the terminal device (for example, Patent Literature 1). In such a terminal device, for example, when user U holds the terminal device T in a vertical state, as shown in FIG. 11 (in other words, a state in which the terminal device T looks long in the vertical direction when seen from user U), the orientation of the screen image is set parallel to the longitudinal direction of the terminal device T, as shown in FIG. 12. Moreover, for example, when user U changes the holding position of the terminal device T and holds the terminal device T in a horizontal state, as shown in FIG. 13 (in other words, a state in which the terminal device T looks long in the horizontal direction when seen from user U), the screen image rotates whereby the orientation of the screen image is set parallel to the shorter side direction of the terminal device T, as shown in FIG. 14.

CITATION LIST

Patent Literature

Patent Literature 1: JP 2008-131616 A

SUMMARY OF INVENTION

Technical Problem

However, there may be a case in which the automatic screen image rotation function should be temporarily suppressed, depending on a using position of user U during use.

Figure 15:
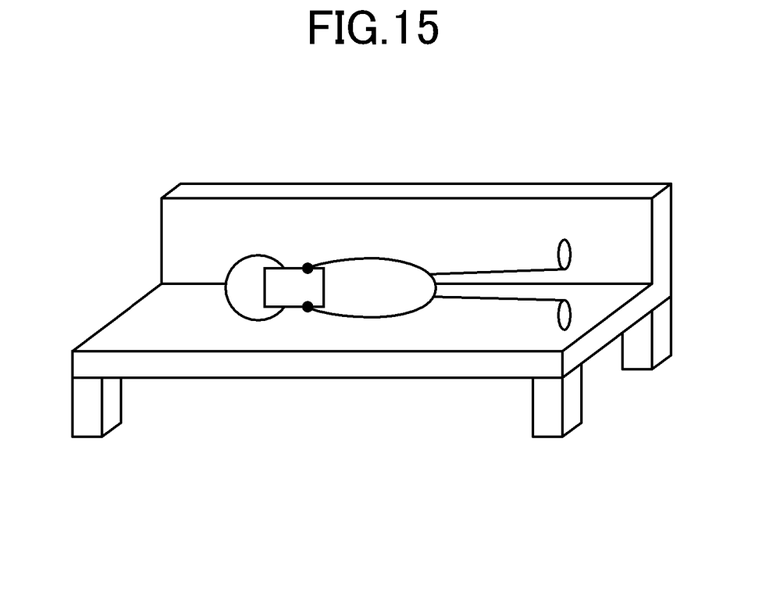
FIG. 15 is a diagram explaining a conventional terminal device.

For example, in the case where the position of user U changes from the position in which user U sits on a sofa and holds the terminal device T in a vertical state for use, as shown in FIG. 11, to the position in which user U lies on the sofa and uses the terminal device T, as shown in FIG. 15, the screen image will rotate in a manner similar to the case shown in FIGS. 13 and 14. In this case, the screen image seen from user U is changed to look like the one shown in FIG. 16, for example, which may not be easy to see.

Generally, in the terminal device, it is possible to invalidate the automatic screen image rotation function. Therefore, when the automatic screen image rotation function is invalidated, the above described inconvenience is not caused. However, once the automatic screen image rotation function is invalidated, the screen image will not rotate even when automatic screen image rotation is desired (for example, when a using position of the terminal device T of user U changes from the one shown in FIG. 11 to the one shown in FIG. 13.)

As described above, user U does not want to permanently suppress the automatic screen image rotation function, but wants to temporarily suppress the automatic screen image rotation function in a specific case (for example, when a using position of the terminal device T of user U changes from the one shown in FIG. 11 to the one shown in FIG. 15). Regarding this point, as to a conventional terminal device, it is necessary to change the setting of the terminal device even when temporal suppression of the automatic screen image rotation function is desired, similarly as in the case of permanently suppressing the automatic screen image rotation function, which user U may find troublesome.

The present invention has been conceived in view of the above, and aims to provide a terminal device, a control method for a terminal device, a program, and an information storage medium for which it is not necessary to change the setting of the terminal device in a manner as the manner for permanently suppressing the automatic screen image rotation function, to temporarily suppress the automatic screen image rotation function.

Solution to Problem

In order to solve the above described problems, a terminal device according to the present invention having a display means for displaying a screen image includes inclination detection means for detecting an inclination of the terminal device, screen image rotation means for rotating the screen image when an inclination state of the terminal device detected by the inclination detection means becomes a predetermined state, captured image obtaining means for obtaining a captured image of image capturing means for capturing an image of a user seeing the screen image, comparison means for comparing a captured image of the image capturing means before the inclination state of the terminal device becomes the predetermined state with a captured image of the image capturing means when or after the inclination state of the terminal device becomes the predetermined state, and suppression means for suppressing rotation of the screen image by the screen image rotation means, based on a result of comparison by the comparison means.

A control method for controlling a terminal device according to the present invention having a display means for displaying a screen image includes a step of obtaining a result of detection by inclination detection means for detecting an inclination of the terminal device, a screen image rotation step of rotating the screen image when an inclination state of the terminal device detected by the inclination detection means becomes a predetermined state, a captured image obtaining step of obtaining a captured image of image capturing means for capturing an image of a user seeing the screen image, a comparison step of comparing a captured image of the image capturing means before the inclination state of the terminal device becomes the predetermined state with a captured image of the image capturing means when or after the inclination state of the terminal device becomes the predetermined state, and a suppression step of suppressing a rotation of the screen image at the screen image rotation step, based on a result of comparison at the comparison step.

A program according to the present invention for causing a terminal device having a display means for displaying a screen image to execute a step of obtaining a result of detection by inclination detection means for detecting an inclination of the terminal device, a screen image rotation step of rotating the screen image when an inclination state of the terminal device detected by the inclination detection means becomes a predetermined state, a captured image obtaining step of obtaining a captured image of image capturing means for capturing an image of a user seeing the screen image, a comparison step of comparing a captured image of the image capturing means before the inclination state of the terminal device becomes the predetermined state with a captured image of the image capturing means when or after the inclination state of the terminal device becomes the predetermined state, and a suppression step of suppressing a rotation of the screen image at the screen image rotation step, based on a result of comparison at the comparison step.

A computer readable information storage medium according to the present invention for storing a program that causes a terminal device having a display means for displaying a screen image to execute a step of obtaining a result of detection by inclination detection means for detecting an inclination of the terminal device, a screen image rotation step of rotating the screen image when an inclination state of the terminal device detected by the inclination detection means becomes a predetermined state, a captured image obtaining step of obtaining a captured image of image capturing means for capturing an image of a user seeing the screen image, a comparison step of comparing a captured image of the image capturing means before the inclination state of the terminal device becomes the predetermined state with a captured image of the image capturing means when or after the inclination state of the terminal device becomes the predetermined state, and a suppression step of suppressing a rotation of the screen image at the screen image rotation step, based on a result of comparison at the comparison step.

In one embodiment of the present invention, the image capturing means may be configured to be capable of changing an operation state of the image capturing means between a first state in which capturing an image is possible and a second state in which power consumption is smaller than in the first state, and the captured image obtaining means may include means for causing the image capturing means to capture an image by changing the operation state of the image capturing means from the second state to the first state before the inclination state of the terminal device detected by the inclination detection means becomes the predetermined state, and changing the operation state of the image capturing means from the first state to the second state after the image capturing means captures an image and means for causing the image capturing means to capture an image by changing the operation state of the image capturing means from the second state to the first state at or after a time when the inclination state of the terminal device detected by the inclination detection means becomes the predetermined state, and changing the operation state of the image capturing means from the first state to the second state after the image capturing means captures an image.

In one embodiment of the present invention, the terminal device may include suppression continuation means for continuing suppression of the rotation of the screen image by the screen image rotation means after the rotation of the screen image by the screen image rotation means is suppressed by the suppression means.

In one embodiment of the present invention, the terminal device may include release means for releasing the suppression by the suppression continuation means when a change of the inclination of the terminal device detected by the inclination detection means becomes equal to or greater than a threshold in the case where the rotation of the screen image by the screen image rotation means is continuously suppressed by the suppression continuation means.

In one embodiment of the present invention, the image capturing means may repeat capturing an image as time passes, and the terminal device may include means for detecting the user from a captured image of the image capturing means, and means for releasing the suppression by the suppression continuation means in a case where a state in which the user is not detected from the captured image of the image capturing means continues for a predetermined period of time while the rotation of the screen image by the screen image rotation means is continuously suppressed by the suppression continuation means.

In one embodiment of the present invention, the comparison means may determine whether or not an amount of difference between orientation of the user in the captured image of the image capturing means before the inclination state of the terminal device becomes the predetermined state and orientation of the user in the captured image of the image capturing means when or after the inclination state of the terminal device becomes the predetermined state is within a predetermined amount, and the suppression means may suppress the rotation of the screen image by the screen image rotation means when the amount of difference is within the predetermined amount.

In one embodiment of the present invention, the comparison means may determine whether or not an amount of difference between a captured image of the image capturing means before the inclination state of the terminal device becomes the predetermined state and a captured image of the image capturing means when or after the inclination state of the terminal device becomes the predetermined state is within a predetermined amount, and the suppression means may suppress the rotation of the screen image by the screen image rotation means when the amount of difference is within the predetermined amount.

Advantageous Effects of Invention

According to the present invention, in order to temporarily suppress the automatic screen image rotation function, it is not necessary to change the setting of the terminal device, in a manner as the manner for permanently suppressing the automatic screen image rotation function.

DESCRIPTION OF EMBODIMENTS

In the following, an example of an embodiment of the present invention will be described in detail based on the drawings.

Figure 1:
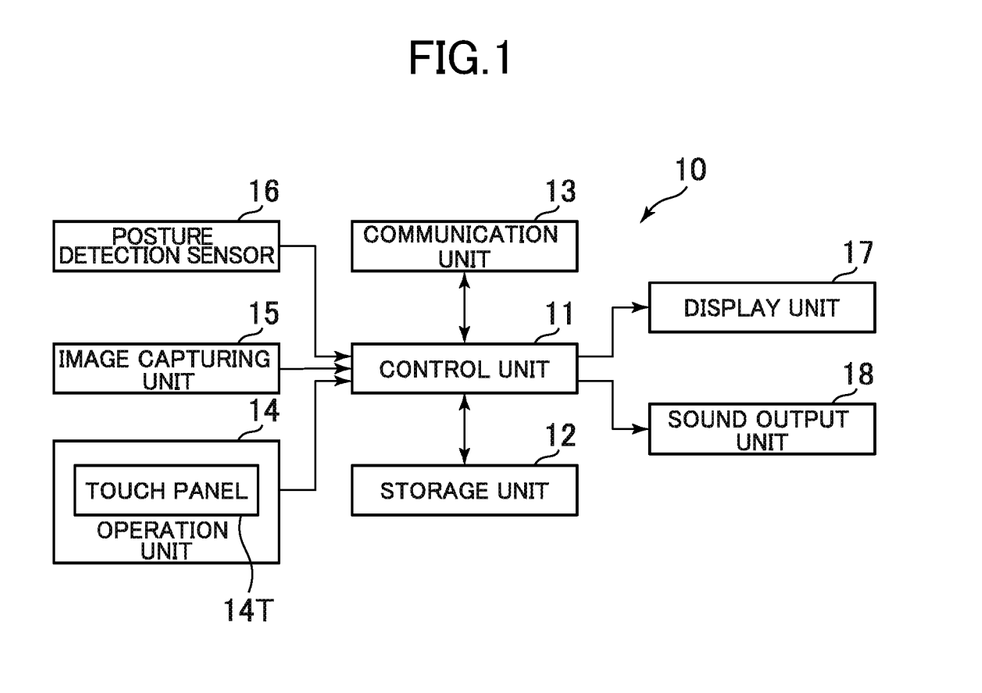
FIG. 1 shows an example of a hardware structure of a terminal device according to an embodiment of the present invention.
Figure 2:
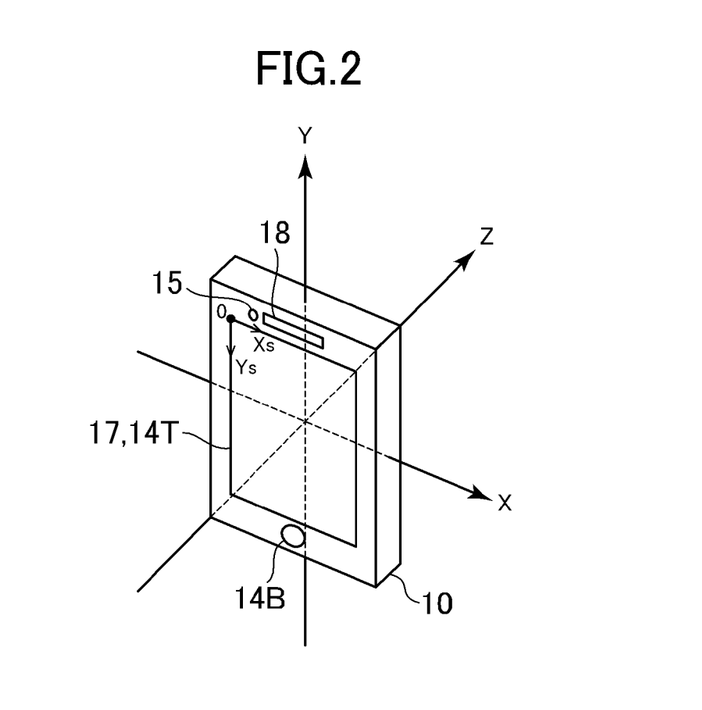
FIG. 2 shows an example of the external appearance of a terminal device according to an embodiment of the present invention.

A terminal device according to an embodiment of the present invention is implemented using, for example, a portable terminal device, such as, for example, a personal digital assistant, a portable phone, a portable game device, or the like. FIG. 1 shows one example of a hardware structure of the terminal device 10 according to this embodiment; FIG. 2 shows one example of the external appearance of the terminal device 10 according to this embodiment.

As shown in FIG. 1, the terminal device 10 includes a control unit 11, a storage unit 12, a communication unit 13, an operation unit 14, an image capturing unit 15, a posture detection sensor 16, a display unit 17, and a sound output unit 18. The control unit 11 includes one or more microprocessors, for example, and executes information processing according to an operating system or a program stored in the storage unit 12. The storage unit 12 includes a main storage unit (for example, a RAM) and an auxiliary storage unit (for example, a hard disk or a solid state drive).

The communication unit 13 is for data communication with other devices via a communication network. A program and data are supplied to the storage unit 12 of the terminal device 10 via a communication network. Note that the terminal device 10 may include a component for reading a program or data stored in an information storage medium such as a memory card, an optical disk, or the like, and the program or data read from the information storage medium may be stored in the storage unit 12.

The operation unit 14 is for a user to perform an operation. For example, the operation unit 14 includes a button 14B provided on the surface of the terminal device 10 (see FIG. 2). Note that the operation unit 14 may include an operation member (for example, a stick, a lever, or the like) other than the button 14B.

Further, the operation unit 14 includes a designated position detection unit for detecting a position designated by a user within the screen of the display unit 17. For example, the operation unit 14 includes a touch panel 14T formed superimposed on the display unit 17. The touch panel 14T is a typical touch panel, and detects a position touched by a user. As the touch panel 14T, a capacitive touch panel is used, for example. In a capacitive touch panel, one or more positions touched by a user are detected, based on change of charge that is caused when the user touches the surface of the touch panel. Note that a touch panel employing other methods, such as a resistive membrane method or the like, may be used instead as the touch panel 14T. Further, the touch panel 14T may be formed integrally with a liquid crystal display (the display unit).

Information indicating a position touched by a user is supplied to the control unit 11 every predetermined period of time (for example, 1/60th of a second). A position touched by a user is expressed as coordinate values of a screen coordinate system, for example. Note that a "screen coordinate system" is a coordinate system such as the one in which the upper left vertex thereof is set as the origin O, the rightward direction is set as the Xs axial positive direction, and the downward direction is set as the Ys axial positive direction, in the condition as shown in FIG. 2, for example. The control unit 11 obtains a position touched by a user, based on the information supplied from the touch panel.

The image capturing unit 15 is an image capture element, such as, for example, a CCD or the like. As shown in FIG. 2, the image capturing unit 15 is set on the surface same as the one on which the display unit 17 is set, and is arranged so that it can capture an image of an object opposed to the display unit 17. Thus, it is possible to capture an image of a user seeing a screen image displayed on the display unit 17, using the image capturing unit 15.

The image capturing unit 15 can capture a static image. Further, the image capturing unit 15 can take a motion picture as well. For example, the image capturing unit 15 captures an image every predetermined period of time (for example, 1/60th of a second). A static image or a motion picture captured by the image capturing unit 15 is stored in the storage unit 12.

Note that the image capturing unit 15 is configured to be capable of switching its operation state between an image capturing enabled state and an image capturing waiting state. An "image capturing enabled state" refers to a state in which power is supplied to the image capturing unit 15, being a state in which it is literally possible to capture an image. Meanwhile, an "image capturing waiting state" refers to a state in which power consumption is smaller than that in the image capturing enabled state, and can be rephrased as, for example, an "image capturing disenabled state", a "sleep state", an "off state", or the like.

The posture detection sensor 16 includes one or more sensors for detecting the posture (inclination) of the terminal device 10. For example, the posture detection sensor 16 includes at least one of an acceleration sensor and a gyro sensor.

For example, an acceleration sensor detects accelerations in three axial directions that are orthogonal to each other (the X axial direction, the Y axial direction, and the Z axial direction). As shown in FIG. 2, the terminal device 10 has a rectangular shape, in which the X axis corresponds to the shorter side direction of the terminal device 10, the Y axis corresponds to the longitudinal direction of the same, and the Z axis corresponds to the depth direction of the same.

Further, for example, a gyro sensor detects an angular speed in three mutually orthogonal axes (the X axis, the Y axis, and the Z axis). That is, the gyro sensor detects a rotation amount of the terminal device 10 per unit period of time when the terminal device 10 rotates about the X axis as a rotation axis. Similarly, the gyro sensor also detects a rotation amount of the terminal device 10 per unit period of time when the terminal device 10 rotates about the Y axis as a rotation axis. Further, the gyro sensor detects a rotation amount of the terminal device 10 per unit period of time when the terminal device 10 rotates about the Z axis as a rotation axis.

Information indicating a result of detection by the posture detection sensor 16 is supplied to the control unit 11 every predetermined period of time (for example, ⅙₀th of a second). The control unit 11 determines the posture (inclination) of the terminal device 10, based on a result of detection by the posture detection sensor 16.

For example, the control unit 11 determines the posture (inclination) of the terminal device 10, based on a result of detection by the acceleration sensor. For example, the control unit 11 determines the posture (inclination) of the terminal device 10, based on how the gravitational accelerations are detected as accelerations in the X, Y, and Z axial directions (see FIG. 4 to be described later).

Further, for example, the control unit 11 determines the posture (inclination) of the terminal device 10, based on a result of detection by the gyro sensor. For example, the control unit 11 integrates the angular speed as to each axis detected by the gyro sensor to thereby determine how much the terminal device 10 has rotated about each axis as a rotation axis.

The display unit 17 is a liquid crystal display or an organic EL display, or the like, for example; the sound output unit 18 is a speaker, a headphone terminal, or the like, for example.

As a conventional terminal device, the terminal device 10 according to this embodiment has an automatic screen image rotation function (see FIGS. 11 to 14). In particular, the terminal device 10 according to this embodiment has a function for temporarily suppressing the automatic screen image rotation function. In the following, a structure for implementing this function will be described.

Figure 3:
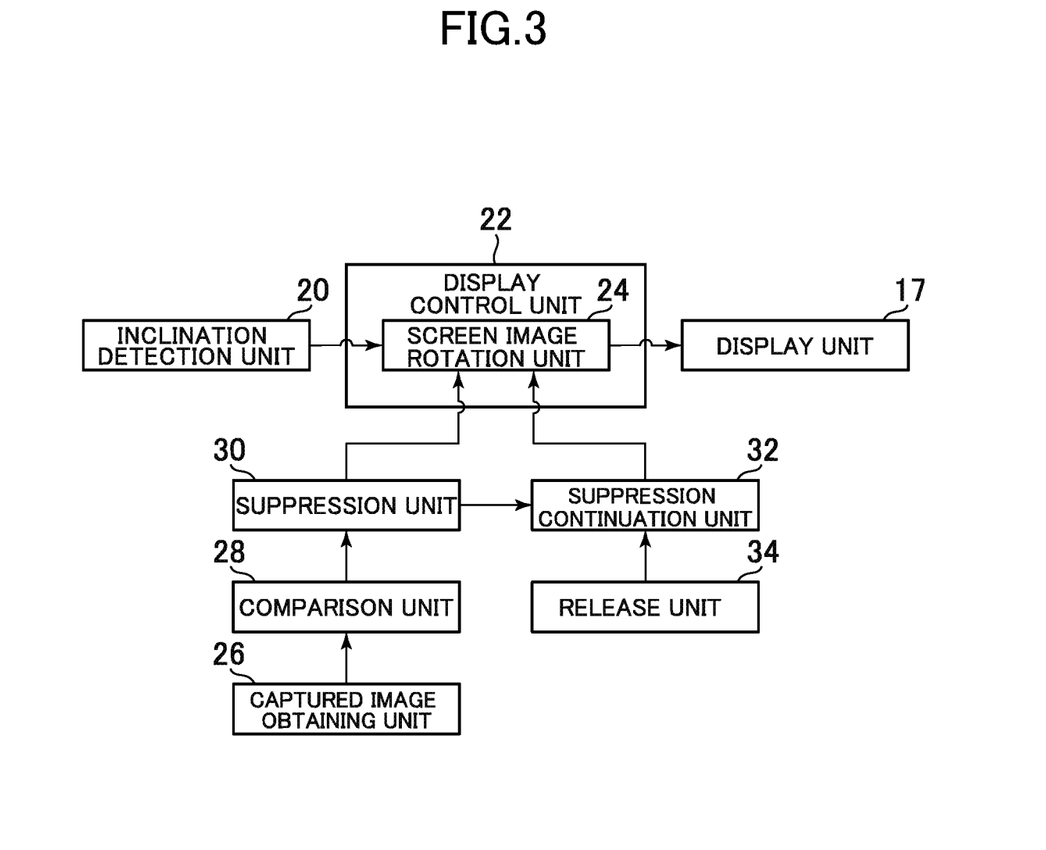
FIG. 3 is a function block diagram of a terminal device according to an embodiment of the present invention.

FIG. 3 is a function block diagram showing function blocks relevant to the above mentioned function among those implemented in the terminal device 10 according to this embodiment. As shown in FIG. 3, the terminal device 10 includes an inclination detection unit 20, a display control unit 22, a captured image obtaining unit 26, a comparison unit 28, a suppression unit 30, a suppression continuation unit 32, and a release unit 34.

The inclination detection unit 20 will be described. The inclination detection unit 20 detects an inclination of the terminal device 10. In this embodiment, the posture detection sensor 16 (for example, the acceleration sensor) corresponds to the inclination detection unit 20.

The display control unit 22 will be described. The display control unit 22 displays a screen image on the display unit 17. The display control unit 22 includes a screen image rotation unit 24.

The screen image rotation unit 24 is relevant to the automatic screen image rotation function. When the inclination state of the terminal device 10 detected by the inclination detection unit 20 (in other words, the amount of inclination with respect to the gravity direction) becomes a predetermined state, the screen image rotation unit 24 rotates the screen image.

Figure 4:
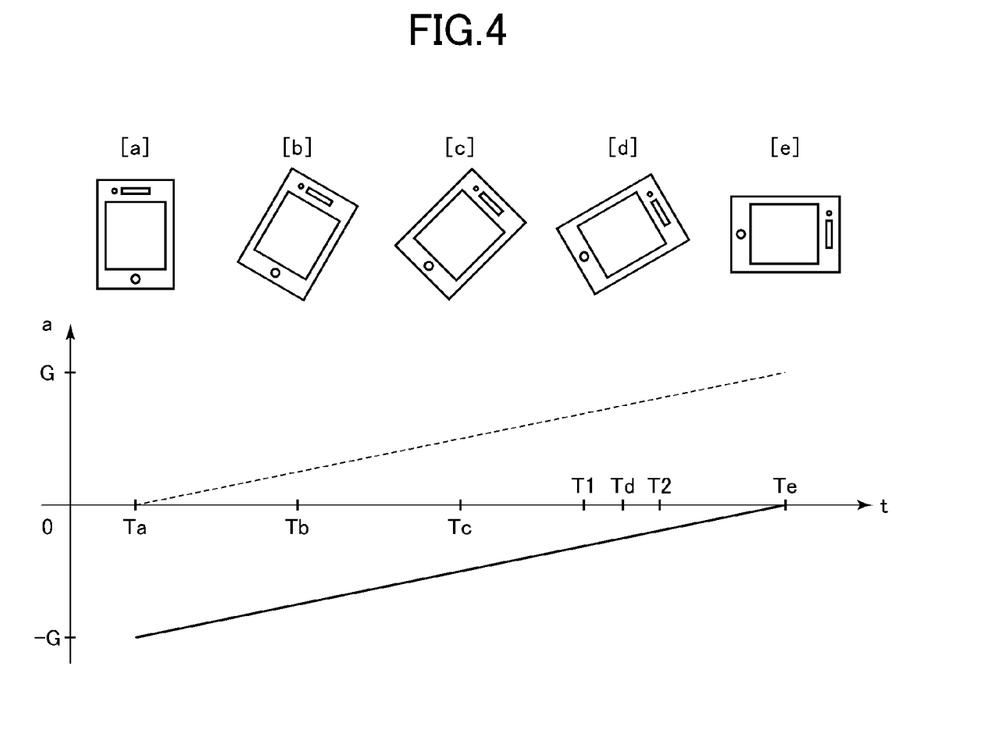
FIG. 4 is a diagram explaining function of a screen image rotation unit (automatic screen image rotation function)

FIG. 4 explains the screen image rotation unit 24. FIG. 4 shows a case in which the terminal device 10 in the vertical state gradually inclines toward the horizontal direction to be in the horizontal state. Further, in FIG. 4, states [a] to [e] are shown as representative states in the process in which the terminal device 10 changes from the vertical state to the horizontal state.

The state [a] is the vertical state. The state [b] is a state inclined toward the horizontal direction from the vertical state by a small amount. The state [c] is a state inclined from the vertical state toward the horizontal direction by an amount greater than that in the state [b]. The state [d] is a state inclined from the vertical state toward the horizontal direction by an amount greater than that in the state [c]. The state [e] is the horizontal state.

Further, the graph shown in FIG. 4 shows one example of a result of detection by the acceleration sensor (the posture detection sensor 16). Note that only gravitational acceleration is taken into consideration here. The solid line in the graph indicates an acceleration in the Y axial direction; the dot line in the graph indicates an acceleration in the X axial direction. The t axis indicates a time axis, and times Ta, Tb, Tc, Td, and Te respectively indicate points of time when the inclination state of the terminal device 10 becomes the states [a], [b], [c], [d], and [e]. The a axis indicates an acceleration, and "G" indicates the gravitational acceleration.

As shown in FIG. 4, in the vertical state (state [a]), the gravitational acceleration is detected as an acceleration in the Y axial negative direction. Further, as the amount of inclination of the terminal device 10 becomes larger, the acceleration in the Y axial direction comes closer to zero, and the acceleration in the X axial direction comes closer to the gravitational acceleration instead. In the horizontal state (state [e]), the gravitational acceleration is detected as an acceleration in the X axial positive direction.

For example, in the case where the orientation of a screen image is parallel to the longitudinal direction of the display unit 17 (the terminal device 10) (FIG. 12), when the inclination state of the terminal device 10 becomes the state [d], the screen image rotation unit 24 rotates the screen image such that the orientation of the screen image is changed to be parallel to the shorter side direction of the display unit 17 (the terminal device 10) (FIG. 14). Note that the screen image rotation unit 24 may rotate the screen image when the inclination state of the terminal device 10 becomes the state [c] and change the orientation of the screen image from being parallel to the longitudinal direction of the display unit 17 to being parallel to the shorter side direction of the display unit 17.

Below, assume a case where the orientation of the screen image is parallel to the shorter side direction of the display unit 17 and the inclination state of the terminal device 10 is changed from the state [e] to the state [a]. In such a case, when the inclination state of the terminal device 10 becomes the state [b], the screen image rotation unit 24 rotates the screen image such that the orientation of the screen image is changed to be parallel to the longitudinal direction of the display unit 17. Note that the screen image rotation unit 24 may rotate the screen image when the inclination state of the terminal device 10 becomes the state [c] and change the orientation of the screen image from being parallel to the shorter side direction of the display unit 17 to being parallel to the longitudinal direction of the display unit 17.

Figure 5:
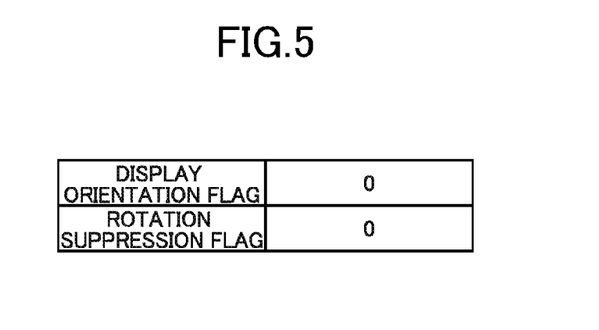
FIG. 5 shows one example of data stored in a storage unit.

Note that data such as is shown in FIG. 5 is stored in the storage unit 12. The data shown in FIG. 5 includes a display orientation flag and a rotation suppression flag. Note that only the display orientation flag will be described here, and the rotation suppression flag will be described later. The display orientation flag is information indicating the current display orientation of a screen image. For example, the value "0" or "1" is set as the display orientation flag. For example, the value "0" corresponds to a state in which the orientation of a screen image is parallel to the longitudinal direction of the display unit 17; the value "1" corresponds to a state in which the orientation of a screen image is parallel to the shorter side direction of the display unit 17. That is, when the display orientation flag is "0", the orientation of the screen image is set parallel to the longitudinal direction of the display unit 17, and when the display orientation flag is "1", the orientation of the screen image is set parallel to the shorter side direction of the display unit 17.

The screen image rotation unit 24 changes the display orientation flag from "0" to "1" when the orientation of a screen image changes from being parallel to the longitudinal direction of the display unit 17 to being parallel to the shorter side direction of the display unit 17. Further, the screen image rotation unit 24 changes the display orientation flag from "1" to "0" when the orientation of a screen image changes from being parallel to the shorter side direction of the display unit 17 to being parallel to the longitudinal direction of the display unit 17.

The captured image obtaining unit 26 will be discussed. The captured image obtaining unit 26 obtains a captured image of the image capturing unit 15 for capturing an image of a user seeing the screen.

Figure 6:
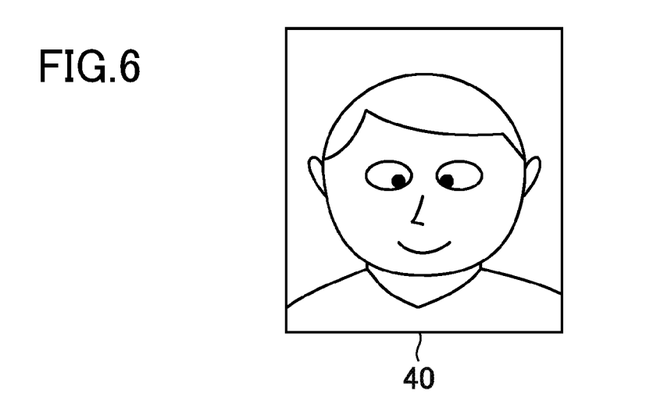
FIG. 6 is a diagram illustrating an example of a captured image.
Figure 7:
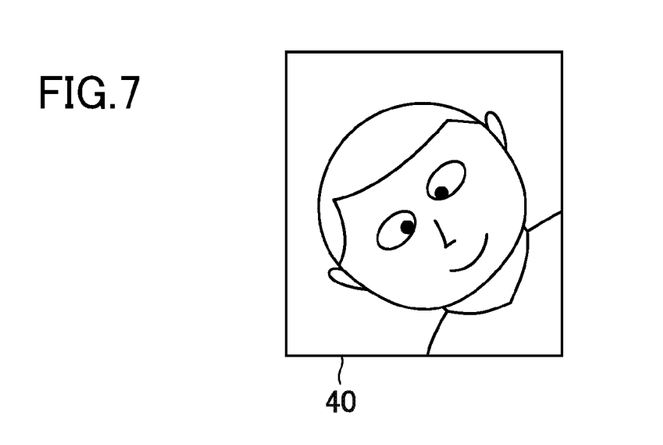
FIG. 7 is a diagram illustrating another example of a captured image.

FIGS. 6 and FIG. 7 show examples of captured images of the image capturing unit 15. FIG. 6 shows a captured image 40 of the image capturing unit 15 in a case where the user holds the terminal device 10 in a vertical state as shown in FIG. 11, for example. In this case, the user appears upright in the captured image 40.

When a user sitting on a sofa lies down on the sofa (i.e., the position of the user is changed from the one shown in FIG. 11 to the one shown in FIG. 15) while maintaining the relative positional relationship between the user and the terminal device 10, the relative positional relationship between the user and the image capturing unit 15 is not changed. As such, the captured image 40 shown in FIG. 6 is captured by the image capturing unit 15 at any point of time during the process in which the user sitting on the sofa lies down on the sofa.

In other words, in the above process, the orientation of the user that appears in the captured image 40 is not changed. That is, although a background area in the captured image 40 is changed, a user area (i.e., an area having a user therein) is scarcely changed. Further, since the user area within the captured image 40 tends to be larger than the background area, a change in the captured image 40 is relatively small in the above process.

On the other hand, for example, when the user changes the manner to hold the terminal device 10 from the vertical state to the horizontal state while sitting on the sofa (i.e., when the position of the user is changed from the one shown in FIG. 11 to the one shown in FIG. 13), the relative positional relationship between the user and the image capturing unit 15 is changed. As such, the orientation of the user that appears in the captured image 40 is changed during the process in which the manner to hold the terminal device 10 is changed from the vertical state to the horizontal state. In other words, as shown in FIG. 7 for example, a captured image 40 in which the user is obliquely shown is also captured in this process.

The comparison unit 28 will be described. The comparison unit 28 compares a captured image 40 of the image capturing unit 15 taken before the inclination state of the terminal device 10 becomes a predetermined state with a captured image 40 of the image capturing unit 15 taken when or after the inclination state of the terminal device 10 becomes the predetermined state.

For example, in the case where the screen image rotation unit 24 is configured to rotate a screen image when the inclination state of the terminal device 10 becomes the state [d], the state [d] corresponds to the above described "predetermined state".

In this case, for example, the comparison unit 28 compares the captured image 40 of the image capturing unit 15 taken at time T1 which is a point of time immediately before time Td (a point of time when the inclination state of the terminal device 10 becomes the state [d]), with the captured image 40 of the image capturing unit 15 taken at time T2 which is a point of time immediately after time Td.

Note that the comparison unit 28 may compare the captured image 40 of the image capturing unit 15 taken at time T1 with the captured image 40 of the image capturing unit 15 at time Td.

In the following, two examples will be explained as function examples of the comparison unit 28. Here, a case is assumed in which a captured image 40 taken at time T1 is compared with a captured image 40 taken at time T2.

[1] The first example will be discussed. The comparison unit 28 compares, for example, orientation of the user that appears in the captured image 40 taken at time T1 with orientation of the user that appears in the captured image 40 taken at time T2. Specifically, the comparison unit 28 determines whether an amount of difference between the orientations of the user that appear in these two captured images 40 is within a predetermined amount.

For example, the comparison unit 28 executes facial recognition processing for captured images 40. Subsequently, the comparison unit 28 obtains the orientation of the user's face based on the result of the facial recognition processing.

Figure 8:
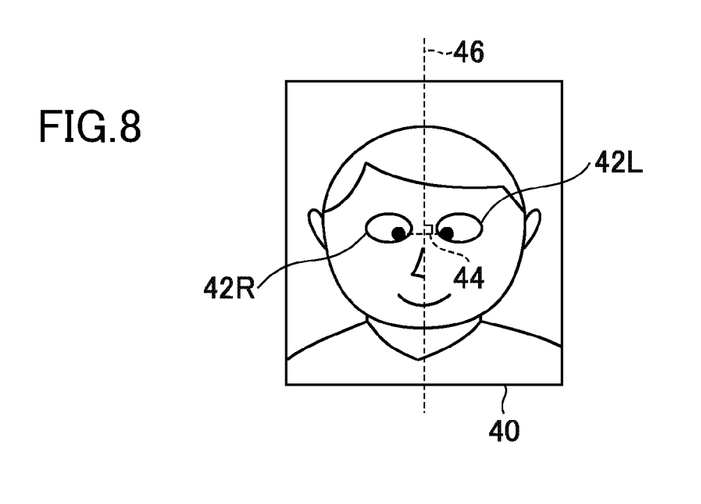
FIG. 8 is a diagram explaining a method of specifying orientation of a face.

For example, as shown in FIG. 8, the comparison unit 28 detects a left eye area 42L and a right eye area 42R. The comparison unit 28 then obtains a straight line 46, which is perpendicular to a straight line 44 connecting the left eye area 42L and the right eye area 42R, as the orientation of the user's face.

Subsequently, the comparison unit 28 determines whether an angle between the straight line 46 in the captured image 40 taken at time T1 and the straight line 46 in the captured image 40 taken at time T2 is equal to or less than a threshold value. Then, in the case where the angle is equal to or less than the threshold value, the comparison unit 28 determines that the amount of difference between the orientations of the user that appear in these two captured images 40 is within the predetermined amount.

Note that the method for obtaining or comparing the orientations of the user (orientations of the user's face) that appear in the captured images 40 is not limited to the method described above. For example, it maybe configured to detect a nose area and a mouth area from the captured image 40 and use a straight line connecting the nose area and the mouth area as the orientation of the user's face. Besides this, a variety of known methods can be used.

[2] Next, the second example will be discussed. For example, the comparison unit 28 determines whether an amount of difference between the captured image 40 taken at time T1 and the captured image 40 taken at time T2 is within a predetermined amount.

Specifically, the comparison unit 28 calculates a difference value of these two captured images 40. Note that the comparison unit 28 may remove the background areas of the captured images 40 with use of known background removing processing, and calculate a difference value of the two captured images 40 with the background areas removed.

Further, the comparison unit 28 determines whether the above difference value is equal to or less than a threshold value. And in the case where the above difference value is equal to or less than the threshold value, the comparison unit 28 determines that the amount of difference between the above two captured images 40 is within the predetermined amount.

Note that the method for determining whether the amount of difference between the captured images 40 is within the predetermined amount is not limited to the method described above, and a variety of known methods may be used.

The suppression unit 30 will be described. The suppression unit 30 suppresses screen image rotation by the screen image rotation unit 24, based on a result of comparison by the comparison unit 28.

For example, when the result of comparison by the comparison unit 28 is a predetermined result, the suppression unit 30 suppresses screen image rotation by the screen image rotation unit 24. Meanwhile, when the result of comparison by the comparison unit 28 is not a predetermined result, the suppression unit 30 does not suppress screen image rotation by the screen image rotation unit 24.

For example, when the comparison unit 28 determines that the amount of difference between the orientations of the user that appear in two captured images 40 is within the predetermined amount, the suppression unit 30 suppresses screen image rotation by the screen image rotation unit 24. On the other hand, when the comparison unit 28 determines that the amount of difference between the orientations of the user that appear in two captured images 40 is not within the predetermined amount, the suppression unit 30 does not suppress screen image rotation by the screen image rotation unit 24.

Further, for example, in a case where the comparison unit 28 determines that the amount of difference between the two captured images 40 is within a predetermined amount, the suppression unit 30 suppresses screen image rotation by the screen image rotation unit 24. Meanwhile, in a case where the comparison unit 28 determines that the amount of difference between the two captured images 40 is not within a predetermined amount, the suppression unit 30 does not suppress screen image rotation by the screen image rotation unit 24.

The suppression continuation unit 32 will be described. The suppression continuation unit 32 keeps suppressing screen image rotation by the screen image rotation unit 24 after the suppression unit 30 suppresses screen image rotation by the screen image rotation unit 24.

In the case where screen image rotation by the screen image rotation unit 24 is suppressed by the suppression unit 30, the suppression continuation unit 32 updates the rotation suppression flag (FIG. 5). The rotation suppression flag is information indicating whether or not to suppress screen image rotation by the screen image rotation unit 24. For example, either the value "0" or "1" is set as the rotation suppression flag. For example, the value "0" indicates that screen image rotation by the screen image rotation unit 24 is not suppressed; the value "1" indicates that screen image rotation by the screen image rotation unit 24 is suppressed.

In the case where screen image rotation by the screen image rotation unit 24 is suppressed by the suppression unit 30, the suppression continuation unit 32 updates the rotation suppression flag to "1". While the rotation suppression flag is set to "1", screen image rotation by the screen image rotation unit 24 is not carried out.

As described above, when a user sitting on a sofa and using the terminal device 10 lies down on the sofa (i.e., the position of the user is changed from the one shown in FIG. 11 to the one shown in FIG. 15) such that the relative positional relationship between the user and the terminal device 10 is maintained, during such a process, the orientation of the user that appears in the captured image 40 is scarcely changed, and a change of the captured image 40 is also small.

Figure 16:
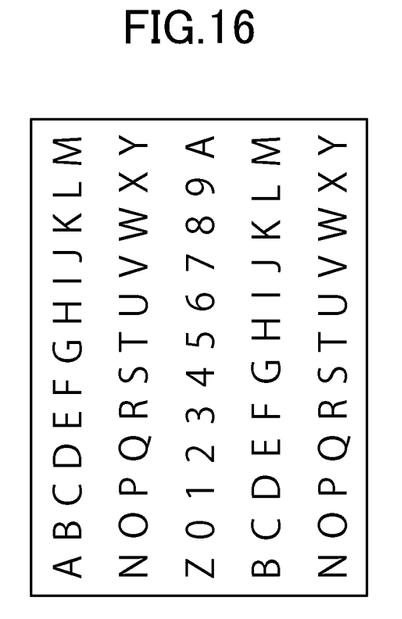
FIG. 16 is a diagram explaining a conventional terminal device.

In this regard, according to the comparison unit 28 and the suppression unit 30, screen image rotation by the screen image rotation unit 24 in the cases as described above is suppressed. As a result, for example, the screen image seen from the user lying on the sofa (FIG. 15) looks like a screen image as shown in FIG. 12, but not like a screen image as shown in FIG. 16.

Further, according to the suppression continuation unit 32, screen image rotation by the screen image rotation unit 24 is continuously suppressed even after the user has lain on the sofa (that is, after the position of the user has changed to the one shown in FIG. 15). That is, the screen image seen from the user remains to be as shown in FIG. 12, for example, even while the user is lying on the sofa.

The release unit 34 will be described. The release unit 34 releases suppression by the suppression continuation unit 32. In this embodiment, the release unit 34 updates the rotation suppression flag to "0" to thereby release suppression by the suppression continuation unit 32.

For example, in the case where the amount of change of the inclination state of the terminal device 10 detected by the inclination detection unit 20 becomes equal to or greater than a threshold while screen image rotation by the screen image rotation unit 24 is continuously suppressed by the suppression continuation unit 32, the release unit 34 releases suppression by the suppression continuation unit 32. According to such a release unit 34, when a user largely changes the inclination of the terminal device 10, suppression by the suppression continuation unit 32 is released and the automatic screen image rotation function becomes valid.

Further, for example, while screen image rotation by the screen image rotation unit 24 is kept suppressed by the suppression continuation unit 32, the release unit 34 determines whether the user is detected from the captured image 40. When finally a predetermined period of time has passed since the last time the user was detected from the captured image 40, the release unit 34 releases suppression by the suppression continuation unit 32. According to such a release unit 34, when a predetermined period of time has passed since the last time the user used the terminal device 10, for example, suppression by the suppression continuation unit 32 is released and the automatic screen image rotation function becomes valid.

In the following, processing that is executed in the terminal device 10 to implement the above described function blocks will be described.

Figure 9:
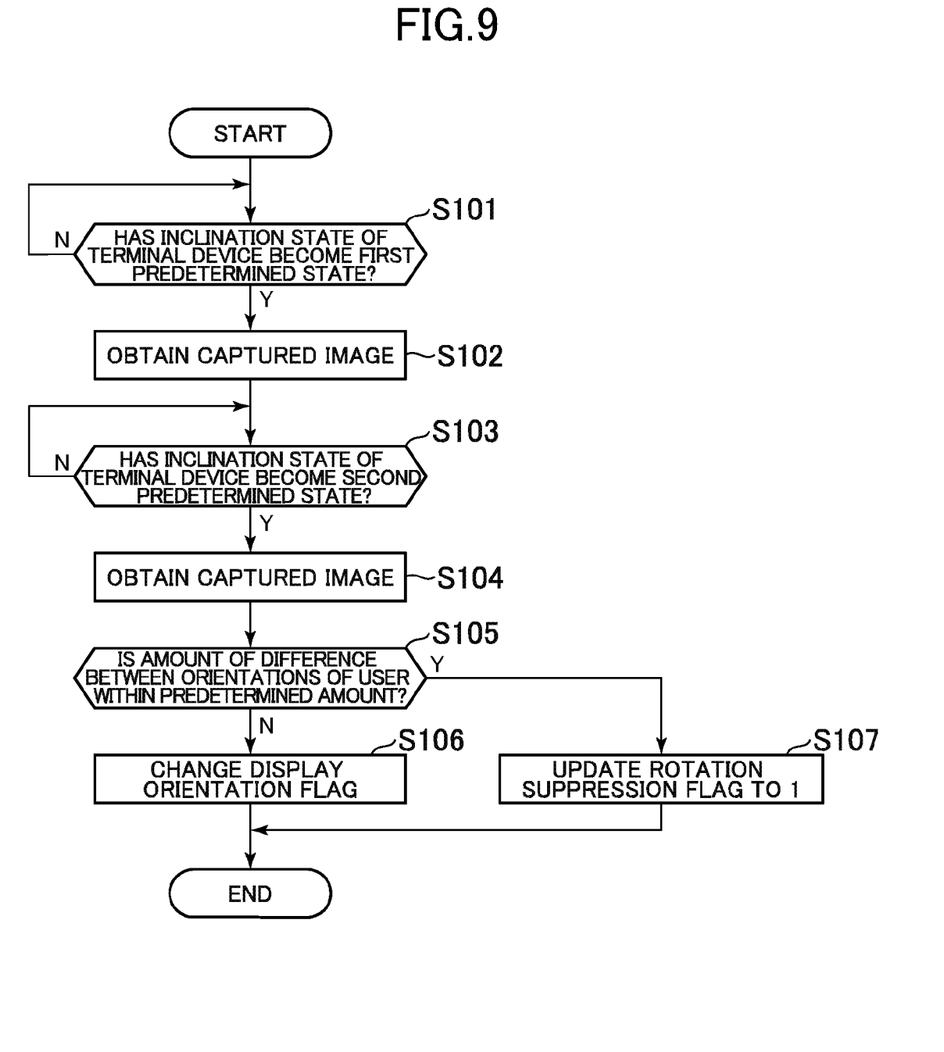
FIG. 9 is a flowchart showing an example of processing executed in a terminal device.

FIG. 9 is a flowchart showing an example of processing for temporarily suppressing the automatic screen image rotation function. The control unit 11 executes the processing shown in FIG. 9 according to a program, to thereby function as the display control unit 22 (the screen image rotation unit 24), the captured image obtaining unit 26, the comparison unit 28, the suppression unit 30, and the suppression continuation unit 32.

Assume here a case in which the inclination state of the terminal device 10 is changed from the state [a] to the state [e], as shown in FIG. 4. Also, assume a case in which a screen image is rotated when the inclination state of the terminal device 10 becomes the state [d].

As shown in FIG. 9, the control unit 11 determines whether or not the inclination state of the terminal device 10 has become the first predetermined state (S101).

Note here that the "first predetermined state" refers to a state prior to the state [d] shown in FIG. 4. For example, a state immediately before the state [d] corresponds to the "first predetermined state". Specifically, the inclination state of the terminal device 10 at time T1 shown in FIG. 4 corresponds to the "first predetermined state".

Whether or not the inclination state of the terminal device 10 has become the first predetermined state is determined based on a result of detection by the acceleration sensor (the posture detection sensor 16). Alternatively, whether or not the inclination state of the terminal device 10 has become a first predetermined state maybe determined based on a result of detection by the gyro sensor (the posture detection sensor 16).

When it is determined that the inclination state of the terminal device 10 has become the first predetermined state, the control unit 11 obtains a captured image 40 (S102).

According to this embodiment, an operation state of the image capturing unit 15 is usually set to the image capturing waiting state. As such, in step S102, the control unit 11 firstly changes the operation state of the image capturing unit 15 from the image capturing waiting state (sleep state or off state) to the image capturing enabled state (on state). The control unit 11 then causes the image capturing unit 15 to capture an image, to thereby obtain a captured image 40 of that point of time. When it is completed to obtain the captured image 40, the control unit 11 returns the operation state of the image capturing unit 15 from the image capturing enabled state (on state) to the image capturing waiting state (sleep state or off state).

Note that it may be configured that the operation state of the image capturing unit 15 is set in advance to the image capturing enabled state, and the image capturing unit 15 is set in advance to automatically capture an image at predetermined interval of time (e.g., 1/30 second). In this case, it is only necessary to configure that in step S102, the control unit 11 reads the latest captured image 40 from the storage unit 12, to thereby obtain the captured image 40.

After execution of step S102, the control unit 11 determines whether or not the inclination state of the terminal device 10 has become a second predetermined state (S103).

Note here that a "second predetermined state" refers to a state after the state [d] shown in FIG. 4. For example, a state immediately after the state [d] corresponds to the "second predetermined state". For example, the inclination state of the terminal device 10 at time T2 shown in FIG. 4 corresponds to the "second predetermined state". Note that the "second predetermined state" may be the state [d].

For example, whether or not the inclination state of the terminal device 10 has become the second predetermined state is determined based on a result of detection by the acceleration sensor (the posture detection sensor 16). Alternatively, whether or not the inclination state of the terminal device 10 has become the second predetermined state may be determined based on a result of detection by the gyro sensor (the posture detection sensor 16).

When it is determined that the inclination state of the terminal device 10 has become the second predetermined state, the control unit 11 obtains a captured image 40 (S104).

Step S104 is the same as step S102. According to this embodiment, an operation state of the image capturing unit 15 is usually set to the image capturing waiting state. As such, in step S104, the control unit 11 firstly changes the operation state of the image capturing unit 15 from the image capturing waiting state (sleep state or off state) to the image capturing enabled state (on state). The control unit 11 then causes the image capturing unit 15 to capture an image, to thereby obtain a captured image 40 of that point of time. When it is completed to obtain the captured image 40, the control unit 11 returns the operation state of the image capturing unit 15 from the image capturing enabled state (on state) to the image capturing waiting state (sleep state or off state).

Note that it may be configured that the operation state of the image capturing unit 15 is set in advance to the image capturing enabled state, and the image capturing unit 15 is set in advance to automatically capture an image at predetermined interval of time (e.g., 1/30 second). In this case, it is only necessary to configure that in step S104, the control unit 11 reads the latest captured image 40 from the storage unit 12, to thereby obtain the captured image 40.

After step S104 is executed, the control unit 11 determines whether an amount of difference between the orientation of the user in the captured image 40 obtained at step S102 and the orientation of the user in the captured image 40 obtained at step S104 is within the predetermined amount (S105).

For example, the control unit 11 executes facial recognition processing for the captured image 40 obtained in step S102 to detect a face, and obtains a vector indicating the orientation of the face (see straight line 46 in FIG. 8).

Further, the control unit 11 executes facial recognition processing for the captured image 40 obtained in step S104 to detect a face, and obtains a vector indicating the orientation of the face (see e.g., straight line 46 in FIG. 8).

Subsequently, the control unit 11 determines whether an angle between the above two vectors is less than a threshold value. In the case where the angle between the above two vectors is less than the threshold value, the control unit 11 determines that the amount of difference between the orientations of the user is within the predetermined amount.

In the case where it is not determined that the amount of difference between the orientations of the user is within the predetermined amount, the control unit 11 changes the display orientation flag (S106). That is, the control unit 11 changes the display orientation flag from "0" to "1." In this case, the screen image rotates, whereby the orientation of the screen image is switched from being parallel to the longitudinal direction of the display unit 17 to being parallel to the shorter side direction of the display unit 17.

Meanwhile, when the amount of difference between the orientations of the user is determined as being within the predetermined amount, the control unit 11 changes the rotation suppression flag (S107). For example, the control unit 11 changes the rotation suppression flag from "0" to "1". In this case, the automatic screen image rotation function becomes invalid, and the screen image no longer rotates.

Note that in step S105, the control unit 11 may determine whether the amount of difference between the captured image 40 obtained in step S102 and the captured image 40 obtained in step S104 is within the predetermined amount. Also, in the case where the amount of difference between the captured images 40 is not within the predetermined amount, the control unit 11 may execute step S106. On the other hand, the amount of difference between the captured images 40 is within the predetermined amount, the control unit 11 may execute step S107.

Figure 10:
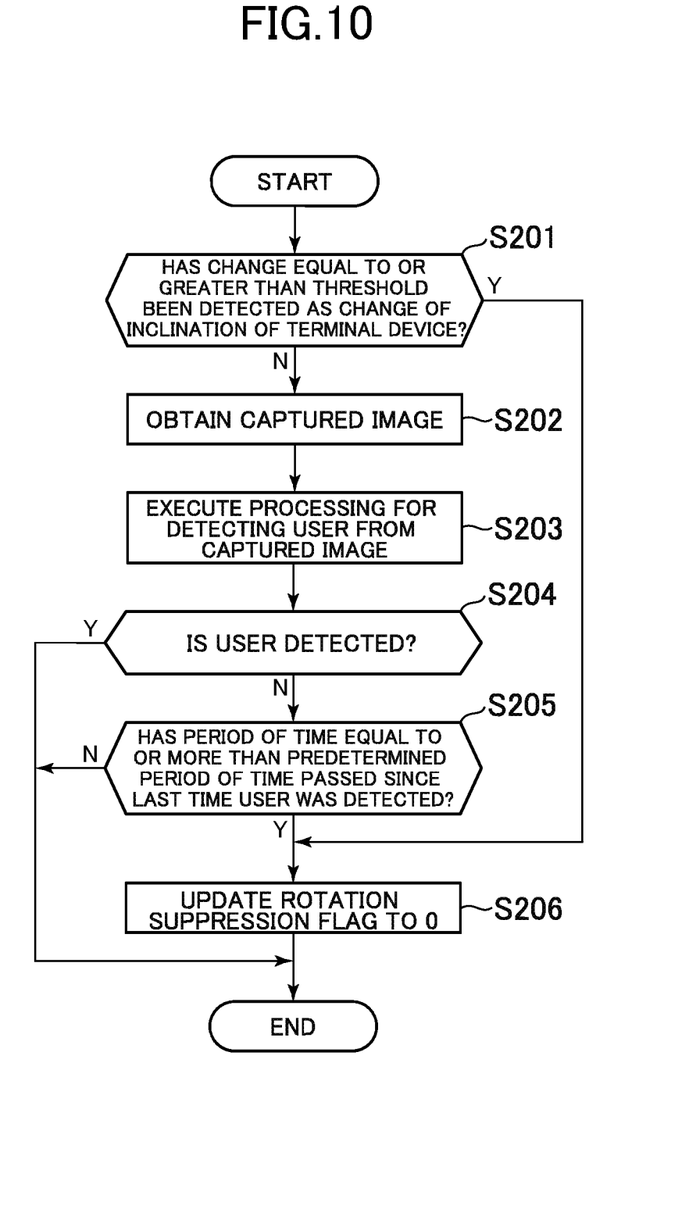
FIG. 10 is a flowchart showing another example of processing executed in a terminal device.

FIG. 10 shows an example of processing that is executed by the control unit 11 every predetermined period of time when the rotation suppression flag is set to "1". The control unit 11 executes the processing shown in FIG. 10 according to a program to thereby function as the release unit 34.

As shown in FIG. 10, the control unit 11 determines whether or not a change equal to or greater than a threshold has been detected as a change of the inclination state of the terminal device 10 (S201). When it is determined that a change equal to or greater than the threshold has been detected, the control unit 11 updates the rotation suppression flag from "1" to "0" (S206). In this case, the automatic screen image rotation function becomes valid, and resultantly, the screen image rotates in accordance with the inclination of the terminal device 10.

On the other hand, when it is determined that a change equal to or greater than the threshold has not been detected, the control unit 11 obtains a captured image 40 (S202).

According to this embodiment, an operation state of the image capturing unit 15 is usually set to the image capturing waiting state. As such, in step S202, the control unit 11 changes the operation state of the image capturing unit 15 from the image capturing waiting state (sleep state or off state) to the image capturing enabled state (on state). The control unit 11 then causes the image capturing unit 15 to capture an image, to thereby obtain a captured image 40 of that point of time. When it is completed to obtain the captured image 40, the control unit 11 returns the operation state of the image capturing unit 15 from the image capturing enabled state (on state) to the image capturing waiting state (sleep state or off state).

Note that, for example, in the case where the operation state of the image capturing unit 15 is set in advance to the image capturing enabled state, and the image capturing unit 15 is set in advance to automatically capture an image at predetermined interval of time (e.g., 1/30 second), the control unit 11 reads the latest captured image 40 from the storage unit 12.

The control unit 11 then executes processing for detecting the user from the captured image 40 (S203), and determines whether the user is detected from the captured image 40 (S204). In the case where the user is detected from the captured image 40, the control unit 11 finishes the processing.

On the other hand, in the case where the user is not detected from the captured image 40, the control unit 11 determines whether the period of time equal to or more than the predetermined period of time has passed since the last time the user was detected (S205). In the case where the period of time equal to or more than the predetermined period of time has not passed since the last time the user was detected, the control unit 11 finishes the processing.

On the other hand, in the case where the period of time equal to or more than the predetermined period of time has passed since the last time the user was detected, the control unit 11 updates the rotation suppression flag from to "1" to "0" (S206). In this case, the automatic screen image rotation function becomes valid, and thus, the screen image rotates in accordance with the inclination of the terminal device 10.

According to the above described terminal device 10, it is possible to temporarily suppress the automatic screen image rotation function. Moreover, according to the terminal device 10, since the automatic screen image rotation function is automatically and temporarily suppressed, when it is desired to temporarily suppress the automatic screen image rotation function, it is no longer necessary to change the setting of the terminal device 10 as in the case for permanently suppressing the automatic screen image rotation function. According to the terminal device 10, the automatic screen image rotation function is temporarily suppressed without causing a user to feel bothered.

Further, the terminal device 10 basically sets an operation state of the image capturing unit 15 to the image capturing waiting state (off state or sleep state), and only when an image needs to be captured (steps S102 and S104 in FIG. 9 and step S202 in FIG. 10), the operation state of the image capturing unit 15 is set to the image capturing enabled state (on state). According to the terminal device 10, it is possible to reduce power consumption.

Note that the present invention is not limited to the above described embodiment.

For example, although two values (0 or 1) are set as the display orientation flag in the above described embodiment, four values (0 to 3) may be set as the display orientation flag. In this case, for example, the value "0" corresponds to the state [a] shown in FIG. 4, the value "1" corresponds to the state [e] shown in FIG. 4. Further, the value "2" corresponds to a state given by reversing the state [a] shown in FIG. 4 upside down, and the value "3" corresponds to a state given by reversing the state [e] shown in FIG. 4 laterally.

The invention claimed is:

1. A terminal device having a display that displays a screen image, comprising:
 a processor; and
 a memory device that stores a plurality of instructions,
 wherein when the processor executes the instructions in the memory device, the processor:
 detects an inclination of the terminal device;
 rotates the screen image when an inclination state of the terminal device becomes a predetermined state;
 obtains a first image captured by a camera before the inclination state of the terminal device becomes the predetermined state, the camera capturing an image of a user viewing the screen image;
 obtains a second image captured by the camera when or after the inclination state of the terminal device becomes the predetermined state;
 compares the first image with the second image; and
 suppresses rotation of the screen image based on a result of the comparison,
 wherein the processor continues suppression of the rotation of the screen image after the rotation of the screen image is suppressed,
 wherein the camera repeats capturing an image as time passes, and a plurality of images are captured by the camera as the time passes while the rotation of the screen image is continuously suppressed, and
 wherein the processor:
 executes processing to detect the user from the image captured by the camera every first predetermined period of time; and
 releases the suppression in a case where a state in which the user is not detected from the captured image continues for a second predetermined period of time since the last time the user is detected from the captured image while the rotation of the screen image is continuously suppressed.

2. The terminal device according to claim 1,
 wherein the camera is configured to be capable of changing its operation state between a first state in which capturing an image is possible and a second state in which power consumption is smaller than in the first state,
 wherein the processor:
 causes the camera to capture the first image by changing the operation state of the camera from the second state to the first state immediately before the inclination state of the terminal device becomes a predetermined value or more, and changing the operation state of the camera from the first state to the second state after the camera captures the first image; and
 causes the camera to capture the second image by changing the operation state of the camera from the second state to the first state at or after a time when the inclination state of the terminal device becomes the predetermined value or more, and changing the operation state of the camera from the first state to the second state after the camera captures the second image.

3. The terminal device according to claim 1, wherein the processor releases the suppression when a change of the inclination of the terminal device becomes equal to or greater than a threshold value in the case where the rotation of the screen image is continuously suppressed.

4. The terminal device according to claim 1,
wherein the processor:
determines whether or not an amount of difference between orientation of the user in the first image and orientation of the user in the second image is within a predetermined amount, and
suppresses the rotation of the screen image when the amount of difference is within the predetermined amount.

5. The terminal device according to claim 1,
wherein the processor:
determines whether or not an amount of difference between the first image and the second image is within a predetermined amount, and
suppresses the rotation of the screen image when the amount of difference is within the predetermined amount.

6. A control method for a terminal device having a display that displays a screen image, the control method comprising:
obtaining a result of detection of an inclination of the terminal device;
rotating the screen image when an inclination state of the terminal device becomes a predetermined state;
obtaining a first image captured by a camera before the inclination state of the terminal device becomes the predetermined state, the camera capturing an image of a user viewing the screen image;
obtaining a second image captured by the camera when or after the inclination state of the terminal device becomes the predetermined state;
comparing the first image with the second image; and
suppressing a rotation of the screen image based on a result of the comparison
wherein the suppression of the rotation of the screen image continues after the rotation of the screen image is suppressed,
wherein the camera repeats capturing an image as time passes, and a plurality of images are captured by the camera as time passes while the rotation of the screen image is continuously suppressed, and
wherein the control method further comprises:
executing processing to detect the user from the image captured by the camera every first predetermined period of time; and
releasing the suppression in a case where a state in which the user is not detected from the captured image continues for a second predetermined period of time since the last time the user is detected from the captured image while the rotation of the screen image is continuously suppressed.

7. A non-transitory computer readable information storage medium storing a program for causing a terminal device, having a display that displays a screen image, to execute:
obtaining a result of detection of an inclination of the terminal device;
rotating the screen image when an inclination state of the terminal device becomes a predetermined state;
obtaining a first image captured by a camera before the inclination state of the terminal device becomes the predetermined state, the camera capturing an image of a user viewing the screen image;
obtaining a second image captured by the camera when or after the inclination state of the terminal device becomes the predetermined state;
comparing the first image with the second image; and
suppressing a rotation of the screen image based on a result of the comparison
wherein the program causes the terminal device to continue suppression of the rotation of the screen image after the rotation of the screen image is suppressed,
wherein the camera repeats capturing an image as time passes, and a plurality of images are captured by the camera as time passes while the rotation of the screen image is continuously suppressed, and
wherein the program further causes the terminal device to execute:
executing processing to detect the user from the image captured by the camera every first predetermined period of time; and
releasing the suppression in a case where a state in which the user is not detected from the captured image continues for a second predetermined period of time since the last time the user is detected from the captured image while the rotation of the screen image is continuously suppressed.

* * * * *